(12) United States Patent
Cohen et al.

(10) Patent No.: US 6,527,460 B2
(45) Date of Patent: Mar. 4, 2003

(54) LIGHT EMITTER CONTROL SYSTEM

(75) Inventors: Mitchell Simmons Cohen, Bedford, MA (US); David Peter Gaio, Rochester, MN (US); William K. Hogan, Rochester, MN (US); Jeannine Madelyn Trewhella, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/893,103

(22) Filed: Jun. 27, 2001

(65) Prior Publication Data

US 2003/0002826 A1 Jan. 2, 2003

(51) Int. Cl.[7] .................................................. G02B 6/36
(52) U.S. Cl. ...................... 385/94; 250/205; 250/214.1; 372/29.02; 372/29.021
(58) Field of Search ............................ 375/94; 250/205, 250/206, 214.1, 214 R, 551; 372/29.02, 29.021, 31, 50, 96

(56) References Cited

U.S. PATENT DOCUMENTS 5,448,077 A * 9/1995 Krause ........................ 250/551
5,757,829 A * 5/1998 Jiang et al. .................... 372/31
5,812,582 A * 9/1998 Gilliland et al. .............. 372/50

OTHER PUBLICATIONS

United States Ser. No. 09/479,109 (Atty. Docket No. YOR919990460US1), entitled: Guides Lithographically Fabricated on Semiconductor Device.

* cited by examiner

Primary Examiner—Robert H. Kim
Assistant Examiner—Elizabeth Gemmell
(74) Attorney, Agent, or Firm—Rabin & Berdo, PC; Robert H. Berdo, Jr.

(57) ABSTRACT

A fiber optic arrangement includes a chip, and a first light emitter and a second light emitter formed on the chip. A guide is formed on the chip and in registration with an active region of the second light emitter. An optical fiber is coupled to the second light emitter for transmitting light from the second light emitter. The guide aligns the optical fiber relative to the active region of the second light emitter. A light-sensing device is provided. An optical element transmits light emitted from the first light emitter to the light-sensing device for controlling an output optical power of at least the second light emitter.

56 Claims, 4 Drawing Sheets

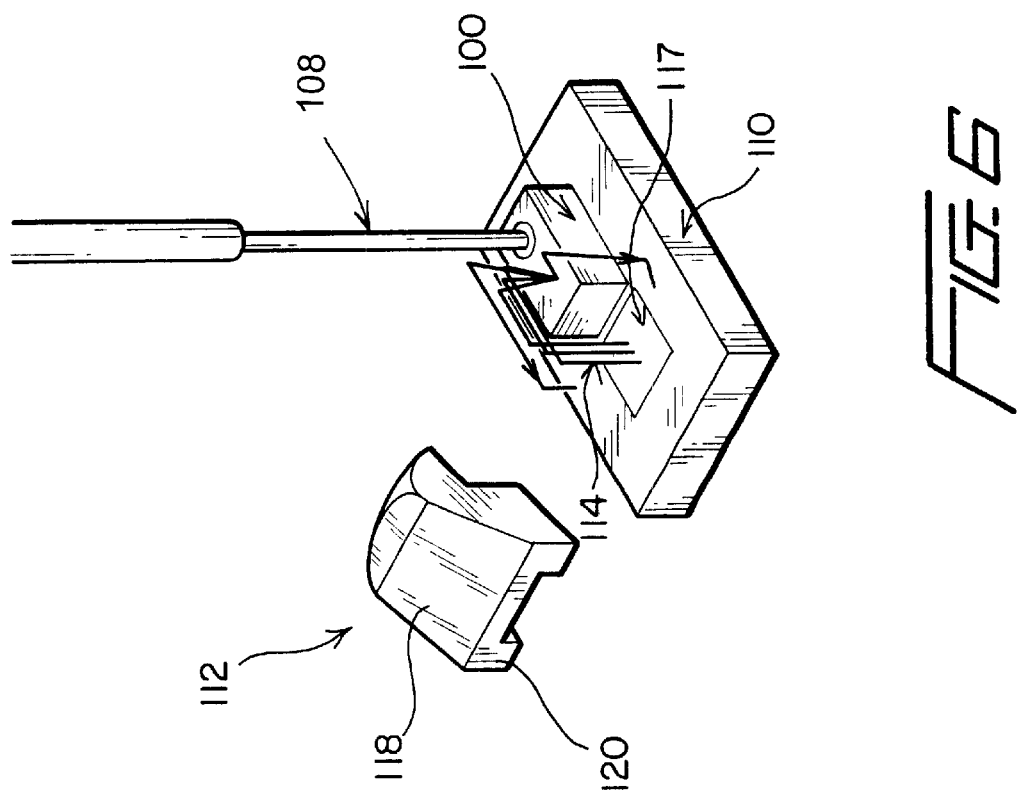
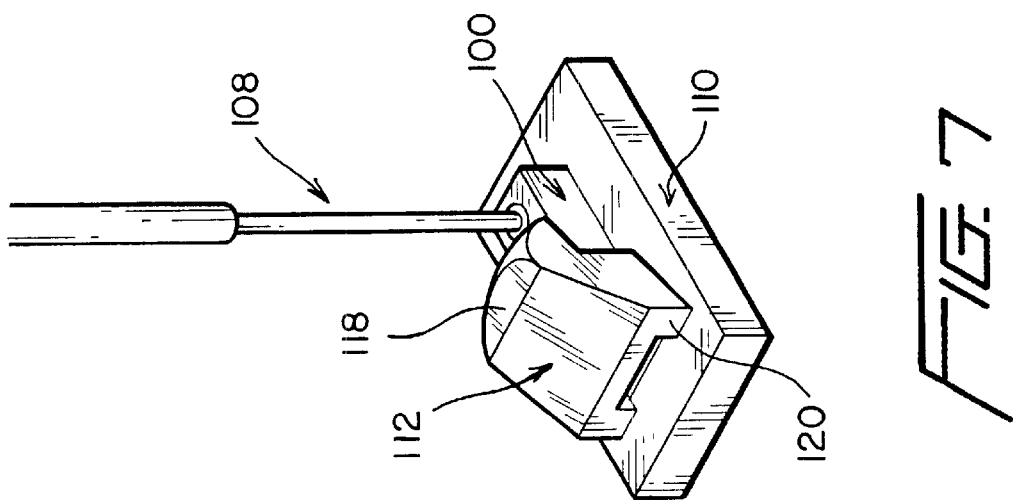

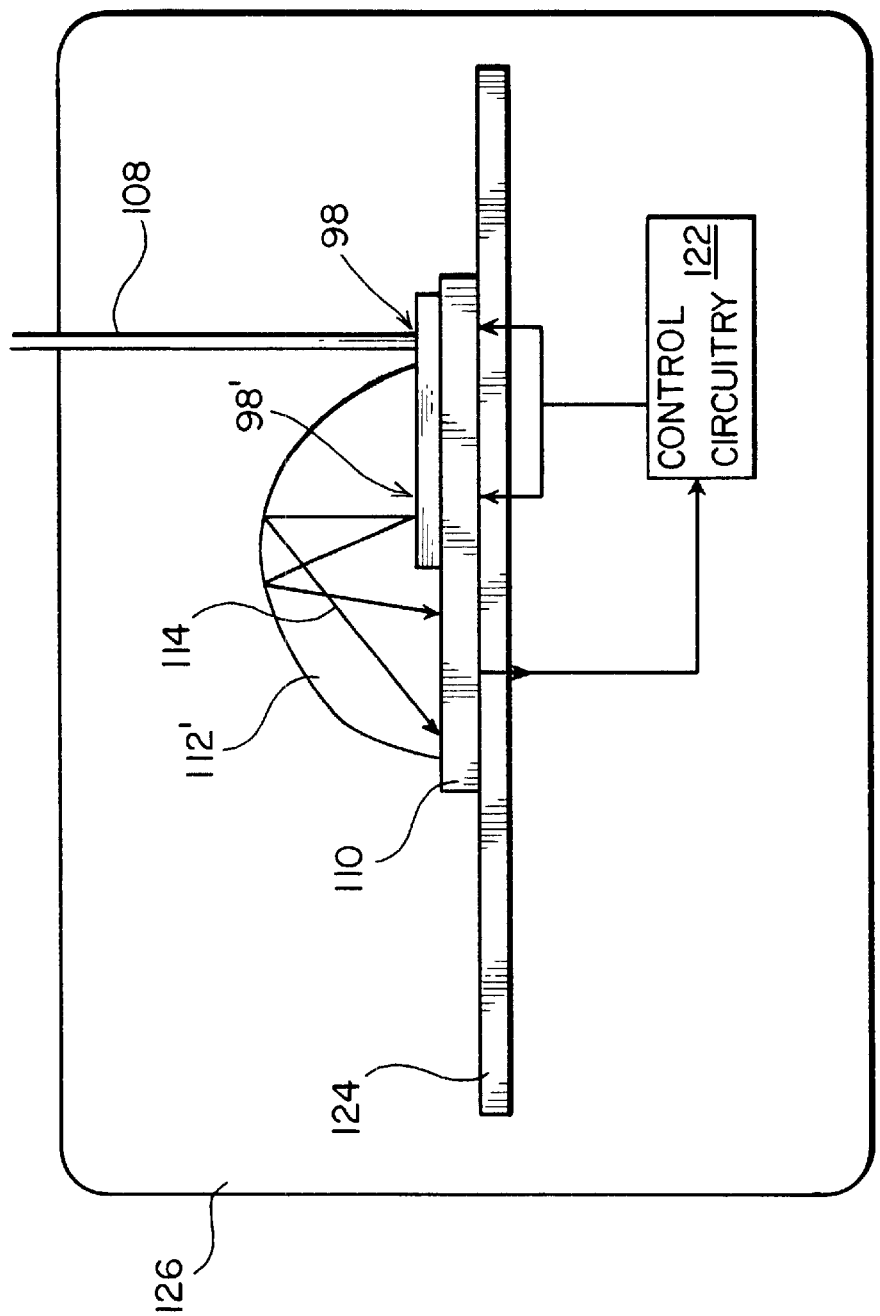

LIGHT EMITTER CONTROL SYSTEM

BACKGROUND OF THE INVENTION

1. Field of the Invention

This invention relates to a light emitter control system, and in particular, to an optical element of a light emitter control system that reflects at least a portion of a light beam from a light emitter to a light-sensing device.

2. Background Information

Computer and communication fiber optic systems are now being developed in which optical devices, such as optical fibers, are used as a conduit for modulated light waves to transmit information. In these fiber optic systems, light emitters are used to produce the light that carries the information. The produced light is then directed to and transmitted by the optical fibers.

Typically, two different types of light emitters are utilized with fiber optic systems. These include, in general, edge emitters and surface emitters. Edge emitters, such as edge emitting lasers, typically have a light emitting portion which is located on an edge of a chip, and typically have an active area that may be, for example, half a micron by four microns in size, for a total area of about 2 square microns. In contrast, surface emitters, such as vertical cavity surface emitting lasers (VCSEL), conventionally have an active area that is substantially larger than the active area of an edge emitter. The active area of a surface emitter is typically around 20 microns in diameter, to provide for about, for example, 400 square microns of active area.

The optical power of a light emitter can vary with changes in the operating temperature or age of the light emitter. These variations can result in inconsistent transmissions.

As such, optical power control systems are used to provide consistent optical power of the light emitters, and thus, more consistent transmissions. In these systems, a portion of the light emitted from the light emitter is detected by a light-sensing device, such as a photodiode, for example, and used to generate a control signal having a signal strength proportional to the emitted optical power. The light-sensing device sends the control signal to control circuitry, which controls the optical power output of the light emitter based on the signal strength of the control signal. The light-sensing device varies the signal strength of the control signal in response to changes in the optical power output of the light emitter.

With edge emitters, such as edge emitting lasers, the control signal has been derived from light emitted from a rear facet of the laser, with a rear facet photodiode collecting and converting the rear facet light to the control signal. That is, the light emitted from the rear facet of the laser is monitored and used to control an output of the light emitted from the front facet.

In contrast, with surface emitters, it is conventional to space the surface emitter away from the end of the optical fiber. This space allows a portion of the emitted light to be collected and utilized for monitoring and controlling the output power of the light beam.

For example, with VCSELs, a portion of the light beam may be directed to a light-sensing device, such as a monitoring photodiode, while allowing the remaining portion of the light beam to be transmitted to the optical fiber. This may be accomplished by using a beam splitter, for example. Alternatively, it is also known to provide an angled glass lid of a TO-CAN package to reflect a portion of the light beam to a photodiode, with the photodiode collecting and converting the reflected light to the control signal.

However, the use of the aforementioned beam splitter disadvantageously increases the cost of the assembly, and reduces the signal strength of the emitted light beam available for transmission to the optical fiber.

Further, the use of the known angled lid in an optical power control system has associated problems. Use of an angled lid requires expensive tooling of equipment to manufacture the angled lids and TO-CAN packages. Further, the lid must be positioned at a precise angle relative to the emitted light beam, in order to allow the partial reflection of the light beam while allowing the rest of the light beam to pass therethrough and to the optical fiber. This requires that the lid be positioned using expensive active alignment techniques. Moreover, it has been shown that an increase in the light output power causes changes in the reflectivity of the angled lid, which may prevent the light from reaching the light-sensing device or optical fiber. Thus, the use of an angled, partially-reflecting glass lid is not an ideal monitoring solution.

Therefore, it would be desirable to provide an optical element for a light emitter control system that would overcome the above-mentioned problems.

It is also known to derive the control signal from light emitted from a VCSEL directly onto a photodiode "flip-chip" mounted to the VCSEL. For example, in a 1×2 VCSEL array, a photodetector has been flip-chip mounted to one of the VCSELs to monitor its power variations and adjust the power output of the other VCSEL.

"Flip-chip" refers to a surface mount chip technology where a chip is packaged in place on a board and then underfilled with an epoxy. Commonly, the chip is attached by placing solder balls on the chip, "flipping" the chip over onto the board and then melting the solder. Flip chips are also mounted on glass substrates, such as LCD drives and smart cards, for example, using a conductive paste.

However, flip-chip mounting photodiodes to VCSELs creates a risk that the VCSEL may be damaged due to contact of the surface of a VCSEL with the photo diode. Therefore, it would be desirable to provide an optical element for a light emitter control system that would not contact the surface of a VCSEL.

As mentioned above, it is conventional to provide a space between the light emitter and the end of the optical fiber. However, this space allows the light emitted from the light emitters to diverge. This divergence may cause some of the emitted light not to reach the optical fibers, thus decreasing the efficiency of the transmission. Further, the divergence of the light increases the difficulty in aligning the emitted light beam with the optical fiber. In order to reduce this divergence, and facilitate the alignment process, the light emitter may be moved to be immediately adjacent to, or even in direct contact with, the optical fiber. However, in such an arrangement, there is no space left between the light emitter and the optical fiber, and thus, no light is readily accessible for creating a photodiode signal. Therefore, it would be desirable to provide a light emitter control system which allows a light emitter to be monitored when the light emitter is directly connected to the optical fiber.

SUMMARY OF THE INVENTION

It is, therefore, a principal object of this invention to provide a light emitter control system.

It is another object of the invention to provide a light emitter control system that solves the above-mentioned problems.

These and other objects of the present invention are accomplished by the light emitter control system disclosed herein.

In one exemplary aspect of the invention, an optical fiber is positioned immediately adjacent, or directly coupled to an active light emitter using a fiber guide formed on a chip of the light emitter. The fiber guide includes a bore fabricated using photolithographic techniques. Further, the fiber guide structure will preferably have precisely determined bore diameters with straight, vertical walls. It is recognized, however, that this would be difficult to fabricate by way of ordinary lithographic measures. Thus, the present invention broadly contemplates, in accordance with at least one presently preferred embodiment, that special lithographic methods be employed in fabricating a fiber guide.

One conceivable way of accomplishing this task would involve patterning a photoresist using standard photolithographic techniques and using the developed resist itself as the final structure. Such a process provides a simple, inexpensive, yet effective method of fabricating the desired fiber guides.

When the optical fiber is connected to the active light emitter in the aforementioned or similar manner, light from the active light emitter is not available for monitoring the optical power of the light emitter. Thus, in another exemplary aspect of the invention, at least two light emitters are provided, with one of the light emitters serving as a dummy light emitter to control the optical power of an active light emitter.

In a further exemplary aspect of the invention, the light emitters are both VCSELs, and are formed on the same chip. By forming the VCSELs on the same chip, it can be ensured that their rates of degradation and their temperature performance will be substantially similar. Moreover, forming the VCSELs immediately adjacent to each other, for example separated by about 250 to 500 microns, further helps to ensure similar performance characteristics. Nevertheless, it is contemplated that the concepts of the present invention may be utilized with other types and configurations of light emitters without departing from the spirit and scope of the invention.

In another exemplary aspect of the invention, the light emitted from the dummy light emitter is detected by a light-sensing device, such as a photodetector. An optical element is used to transmit the light from the dummy light emitter to the light-sensing device. For example, in one exemplary aspect of the invention, the optical element is tailored as an inverted cap that sits over the dummy light emitter and the light-sensing device. The optical element will collect and reflect at least a portion of the light emitted from the dummy light emitter to the light-sensing device, for controlling the active light emitter.

The optical element may be molded from an optical grade polymer. This allows the optical element to be manufactured in an inexpensive manner. However, it is also contemplated that the optical element be formed of other materials without departing from the spirit and scope of the invention. Further, to increase the reflectivity of the optical element, in another aspect of the invention, the surface, for example the exterior surface, of the optical element may be coated with a reflective material, such as a reflective metal.

In another exemplary aspect of the invention, the optical element includes a plurality, for example, two or three reflecting surfaces arranged at angles relative to each other. The reflecting surfaces can be tailored and arranged to help direct the light emitted from the dummy light emitter to the light-sensing device.

It is not necessary that all of the light emitted from the dummy light emitter be received by the light-sensing device. That is, the light-sensing device need only detect a portion of the light emitted from the dummy light emitter in order to control the optical output of the active light emitter. As such, the precise configuration and placement of the optical element is not critical. Thus, the optical element can be easily manufactured, and inexpensively placed.

In another exemplary aspect of the invention, the optical element is tailored so that the light emitted by the dummy light emitter is scattered and dispersed. This can be accomplished through the placement of the plurality of reflecting surfaces, for example. This allows for the creation of an optical light spot that may be significantly larger than the active area of the light-sensing device. Thus, this configuration allows the optical element to be positioned without a high regard for positional tolerances, using passive alignment techniques, for example, which reduces manufacturing costs.

In a further exemplary aspect of the invention, the outer surface of the optical element has a relatively smooth region that allows the optical element to be picked up using a conventional vacuum pick-up placement device. This configuration facilitates the manufacturing of the device, by allowing automation to pick-up and place the optical element over the light emitters and light-sensing device.

In another aspect of the invention, the optical element is positioned over the dummy light emitter, so that a gap exists between the lower edges of the optical element and the surface of the dummy light emitter. That is, the optical element does not directly contact the dummy light emitter. By providing a gap, for example of a few hundred microns, it can be ensured that the optical element will not damage the fragile surface of the light emitter.

Further, in another exemplary aspect of the invention, the optical element could be provided with feet that rest directly upon the photodiode chip, and which are tailored so that the optical element is positioned over the dummy VCSEL with the desired gap. The feet could then be fastened to the photodiode chip using a UV curable epoxy, for example. Alternatively, instead of feet, the gap could be formed by depositing the UV curable epoxy, for example, to a thickness that would provide for the desired gap.

In another exemplary aspect of the invention, instead of having a molded cap-shaped optical element, the optical element could be configured as a somewhat rounded glob of transparent epoxy, for example. The epoxy (or other suitable material) could be easily deposited over the light emitters and the light-sensing device while in a semi-liquid state, and then allowed to cure. In use, some of the emitted light from the dummy light emitter will be internally reflected within the optical element to reach the light-sensing device. It is believed that the total light reaching the light-sensing device will be less than when using a molded optical element, as described above. Nevertheless, it is further believed that this arrangement will provide sufficient light to the light-sensing device to monitor and control the optical power of the active light emitter, as will be described. Moreover, this aspect of the invention would be easy to implement, and eliminates one of the two-steps of the earlier-described aspect of the invention, i.e., the optical element will be self-fastening to the light-sensing device and the light emitters.

In an exemplary explanation of the use of this arrangement, a portion of the light emitted from the dummy light emitter is collected and reflected by the optical element to the light-sensing device. The light-sensing device uses the detected light to generate a control signal having a signal strength proportional to the optical power of the emitted light. The light-sensing device sends the control signal to control circuitry, which controls the optical power output of both the active and dummy light emitters based on the signal strength of the control signal.

Thus, the light-sensing device varies the signal strength of the control signal in response to changes in the optical power output of the dummy light emitter. Further, the dummy light emitter, light-sensing device and control circuitry form a closed loop system used to control the optical power output of the active light emitter.

BRIEF DESCRIPTION OF THE DRAWINGS

FIG. 6 is a perspective exploded view of the arrangement shown in FIG. 5, showing the active region of a light-sensing device.

FIG. 7 is a perspective view of the arrangement shown in FIG. 5.

FIG. 9 is a side view of yet another exemplary aspect of an optical element according to the present invention, showing control circuitry.

DETAILED DESCRIPTION OF THE PREFERRED EMBODIMENTS

The invention will now be described in more detail by way of example with reference to t he embodiments shown in the accompanying figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

In one aspect of the present invention, an optical fiber is positioned immediately adjacent, or directly coupled to an active light emitter, such as a VCSEL (vertical cavity surface-emitting laser). Such an arrangement is disclosed in co-pending patent application "Guides Lithographically Fabricated on Semiconductor Devices", by Cohen et al., attorney reference no. YO-999-460, assigned to International Business Machines Corporation, of Armonk, N.Y.

Figure 1:
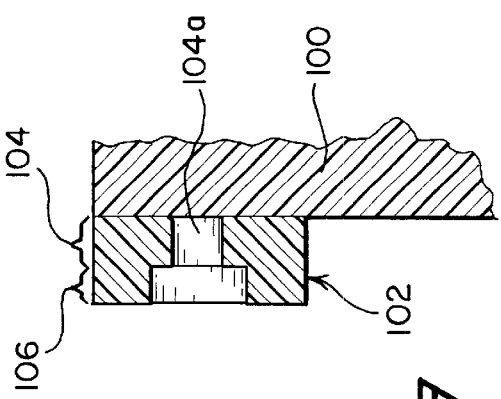
FIGS. 1 and 2 illustrate a plan view and a side sectional view, respectively, of a VCSEL chip with an incorporated fiber guide structure.
Figure 2:
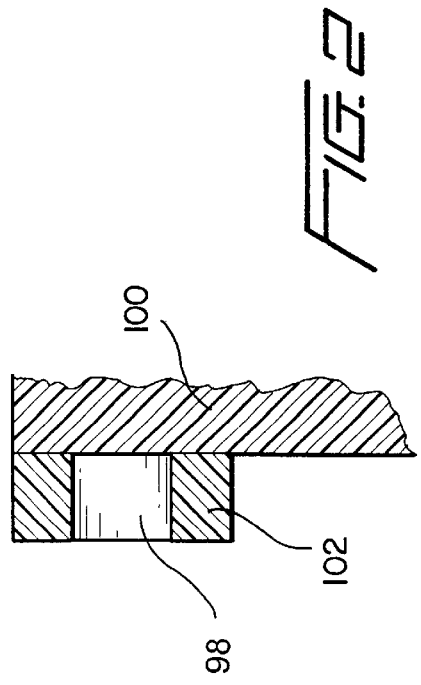

In particular, and as shown in FIGS. 1 and 2, an exemplary light emitter 98 is formed on a chip 100. Chip 100 includes a bonding pad 101 (for wire bonding), an associated conductive strip 101a, and a narrow aperture 101b defining an active area of the VCSEL, for example, for emitting a laser beam. A fiber guide 102 is formed on the chip 100, and in axial registration with the active area of the light emitter.

Fiber guide 102 includes a bore fabricated using photolithographic techniques, for example. In this exemplary aspect of the invention, the bore has an inside diameter of about 125 microns, and has a height of about 40 microns (i.e., the horizontal direction in FIG. 2). Generally, any height within the range of about 30–50 microns is acceptable.

To ensure the fiber end of the optical fiber (not shown in these figures) does not damage the optically active area of the light emitter during the insertion of the fiber into the bore of the fiber guide 102, a gap of some 10–20 microns may be left between the fiber and the chip after completion of the insertion process. In this way, the delicate optically active region of the light emitter is protected from mechanical damage. This insertion procedure may be carried out, for example, with the use of a precision linear stage operated under computer control. In this connection, the fiber may first be lowered until the fiber end contacts the chip surface in a region safely away from the optically active region of the light emitter, thereby establishing a reference position, so that it can later be positioned with the desired fiber-to-chip gap. The gap may be filled with a suitable transparent material. Such a material could be, for example, an adhesive, which is used to anchor the fiber to the fiber guide upon completion of the fiber insertion step.

Figure 3:
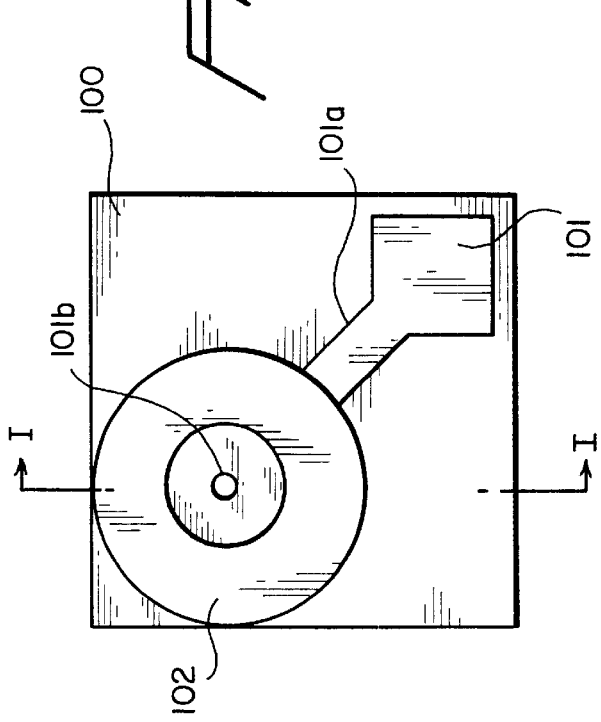
FIG. 3 illustrates a variation of the fiber guide structure which includes a fiber stop portion.

In an alternative method of achieving the same goal, and as shown in FIG. 3, a stop 104 may be provided for the fiber so that the end face of the fiber does not hit the delicate surface of the chip. In this manner, the fiber stop 104, which contains a central hole 104a smaller in diameter than the fiber, will essentially act as a bumper. Thus, a fiber entering the guide 102 would be stopped and at least part of it would rest on the annular "ledge" that serves as the transition between the fiber stop 104 and the rest of fiber guide 102. This fiber stop 104, which could be 10–20 microns thick, may be made by first spin coating a thin photoresist layer; this layer is exposed but not developed. A second, thicker photoresist layer (indicated at 106) is then applied over the first layer 104, exposed, and the entire structure is then simultaneously developed to result in the fiber guide structure 102 shown in FIG. 3.

Figure 4:
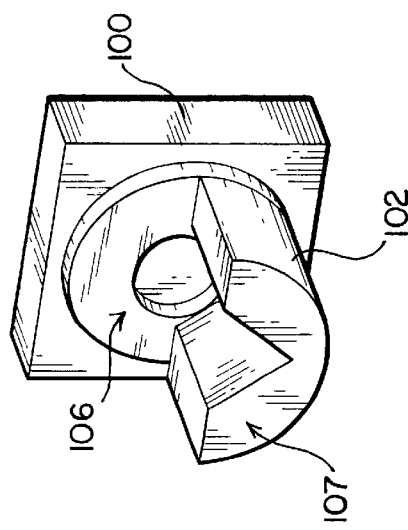
FIG. 4 illustrates a variation of the fiber guide structure with an under-constrained entry portion as a fiber lead in, thereby permitting fiber insertion by means of an initial lateral, rather than axial force.

Referring also to FIG. 4, a third possible aspect of the fiber guide structure 102 would incorporate an under-constrained entry structure 107 as an outer component on a fully-constrained fiber guide structure component, wherein the filly-constrained fiber guide structure component would have the appearance illustrated in FIGS. 1 and 2. This under-constrained entry structure 107 could take the form of a V-groove. It would provide a self-aligning feature for the fiber, thereby loosening the lateral tolerances for insertion of the fiber into the bore by the procedures described above, which could lead to significant cost savings. Initially, a fiber insertion tool need only bring the fiber into the V-groove by means of a lateral force perpendicular to the V-groove bottom. The fiber would thereby be made to lie in the V-groove and be parallel to it. After the initial insertion step, the fiber can be inserted into the fully constrained fiber guide structure component by application of a force perpendicular to the chip surface. The under-constrained entry structure 107 can be combined with the fully constrained entry structure 106 to make the complete fiber guide as just described. Alternatively, for better protection of the chip surface, the under-constrained entry structure 107 can be combined with both the fully constrained entry structure 106 and the fiber stop structure 104. Alternatively, the under-constrained entry structure 107 can be combined with the fiber stop structure 104 alone. Furthermore, it is possible to make the fiber guide using the under-constrained entry structure 107 alone, directly fabricated on the optoelectronic chip; however in this case the very precise alignment offered by the fully constrained entry structure would not be available.

In order to provide adequate mechanical stability for the fiber inserted into the fiber guide 102, the aspect ratio (height-to-width ratio) of the fiber guide 102 should be adequate. Since the fiber guide 102 serves to keep the fiber aligned to the optically active region of the chip until adhesive is applied and cured, and since the fiber is usually about 125 microns in diameter, the structure 102 should preferably be at least about 10 microns in thickness in order to maintain alignment successfully. Experiments have in fact shown that wall heights (or thicknesses) of 30–50 microns are more than adequate for this purpose.

The fiber guide 102 will preferably have precisely determined bore diameters with straight, vertical walls. It is recognized, however, that this would be difficult to fabricate by way of ordinary lithographic measures. Thus, the present invention broadly contemplates, in accordance with at least one exemplary aspect of the invention, that special lithographic methods be employed in fabricating the fiber guide 102.

One conceivable way of accomplishing this task would involve depositing a material such as a metal on a wafer. Bores could be etched in the deposited material by dry etching, i.e., reactive ion etching (RIB). Alternatively, a photoresist can be patterned using standard photolithographic techniques and using the developed resist itself as the final structure. Such a process provides a simple, inexpensive, yet effective method of fabricating the desired fiber guides.

The photoresists normally used in standard semiconductor fabrication are typically only a few microns thick, and hence cannot generally offer the desired height-to-width aspect ratios. There are, however, some specialized resists, which can be used for this purpose. Such resists are, for example, THB-521 (positive resist) and THB-30LB (negative resist) both from the Japan Synthetic Rubber Co, of Tokyo, Japan. The photoresist called "SU8" from the MicroChem Corp., of Newton, Mass. is of special interest, and may be utilized in accordance with at least one aspect of the present invention, because it permits fabrication of resist structures with straight vertical walls and high aspect ratios having values that can exceed 15. The SU-8, which is a negative resist (i.e., it "crosslinks" where light impinges) has the advantages of being an epoxy with high modulus and transparency at the wavelengths of interest, so that the patterned resist itself can be used with confidence as the desired fiber guide structure. "Crosslink" is a term of art meaning the monomers (relatively-short-organic molecules forming-the pre-exposed form of the photoresist) link one to another (as a result of absorbing light during the lithographic exposure step) to form longer molecular structures. These longer molecular structures have much more durable mechanical and chemical properties (i.e. will resist chemical attack, and will withstand mechanical forces) than the monomers.

The SU-8 photoresist may be spin-coated, by conventional methods, on wafers (e.g., GaAs) containing one or more, for example an array, of light transmitters (VCSELs). The fiber guide structures may then be made by standard exposure and development procedures for the SU-8, wherein the usual mask-alignment techniques used in the semiconductor industry would ensure that the SU-8 fiber bores are precisely aligned to the corresponding optically active regions on the wafers. After fabrication of the fiber guide structures, the wafer may be diced and mounted, for example in a transceiver package. The fibers may then be inserted into the bores of the respective fiber guides. The fibers may be bonded to the respective fiber guides using an adhesive (e.g. epoxy) after insertion of the fiber into the guide. Use of a UV-crosslinkable adhesive is advantageous for this purpose because the crosslinking operation may be carried out very quickly. However, the step involving bonding the fiber permanently to the fiber guide could be omitted, should it be desired to allow the removal of the fiber from the guide.

Figure 5:
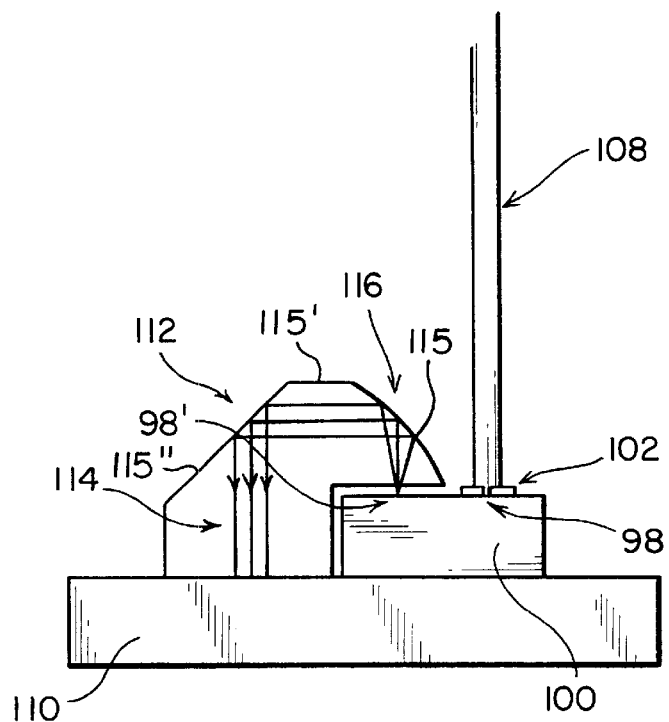
FIG. 5 is a side view of one aspect of an optical element according to the present invention, which may be used in conjunction with the fiber guide structure shown in FIGS. 1–4.

As shown in FIG. 5, when an optical fiber 108 is directly connected to the active light emitter 98 using a fiber guide 102 or in similar manner, light from the active light emitter is not available for monitoring the optical power of the light emitter. However, it has been shown that two adjacent light emitters, such as VCSELs, disposed on the same chip or wafer, exhibit similar temperature performance and degradation behavior (see *VCSEL Devices and Packaging*, Michael S. Lebby et al., SPIE Vol. 3289, pp 2–12 (1998). Thus, in an exemplary aspect of the invention, at least two light emitters 98, 98' are provided, with one of the light emitters serving as a dummy light emitter 98' to control the optical power of the active light emitter 98.

In this exemplary aspect of the invention, the dummy light emitter 98' and the active light emitter 98 are both VCSELs, and are formed on the same chip 100. By forming the VCSELs on the same chip, it can be ensured that their rates of degradation and their temperature performance will be substantially similar. Moreover, forming the VCSELs immediately adjacent to each other, for example separated only by about 250 to 500 microns, further helps to ensure similar performance characteristics. Nevertheless, it is contemplated that the concepts of the present invention may be utilized with other types and configurations of light emitters without departing from the spirit and scope of the invention.

In an exemplary aspect of the invention, the light emitted from the dummy light emitter 98' is detected by a light-sensing device 110, such as a monitor photodetector. An optical element 112 is used to transmit the light 114 from the dummy light emitter 98' to the light-sensing device 110. For example, in one exemplary aspect of the invention, the optical element 112 is tailored as an inverted cap that sits over the dummy light emitter 98' and the light-sensing device 110. The optical element 112 will collect and reflect at least a portion of the light 114 emitted from the dummy light emitter 98' to the light-sensing device 110, for controlling the active light emitter 98, in a manner that will be described more fully in the paragraphs that follow.

In the illustrated exemplary embodiment, the optical element 112 is molded from an optical grade polymer. This allows the optical element 112 to be manufactured in an inexpensive manner. However, it is also contemplated that the optical element 112 can be formed from other materials without departing from the spirit and scope of the invention. Further, to increase the reflectivity of the optical element 112, in another aspect of the invention, the surface, for example the exterior surface, of the optical element may be coated with a reflective material 116, such as a reflective metal.

In another exemplary aspect of the invention, the optical element 112 includes a plurality of, for example two or three, reflecting surfaces 115, 115', 115" arranged at angles relative to each other. The reflecting surfaces 115, 115', 115" can be tailored and arranged to help direct the light 114 emitted from the dummy light emitter 98' sequentially to the light-sensing device 110.

It is not necessary that all of the light 114 emitted from the dummy light emitter 98' be received by the light-sensing device 110. That is, the light-sensing device 110 need only detect a portion of the light 114 emitted from the dummy light emitter 98' in order to control the optical output of the active light emitter 98. As such, the precise configuration and placement of the optical element 112 is not critical. Thus, the optical element 112 can be easily manufactured, and inexpensively placed.

Referring also to FIG. 6, in a further exemplary aspect of the invention, the optical element 112 is tailored so that the light 114 emitted by the dummy light emitter 98' is somewhat scattered and dispersed. This can be accomplished through the configuration and placement of the reflecting surfaces 115, 115', 115", for example. Scattering of the light allows for the creation of an optical light spot that may be significantly larger than an active area 117 of the light-sensing device 110. By way of example, assume the light-sensing device 110 has a 100-micron diameter active area, and the optical light spot of the light beam 114 emitted by the dummy light emitter 98' has a diameter of 500 microns due to scattering of the light. As will be appreciated, the active area 117 of the light-sensing device 110 could be positioned anywhere within the large optical light spot while still detecting the emitted light. Thus, this configuration allows the optical element 112 to be positioned without a high regard for positional tolerances, using passive alignment techniques, for example, which reduces manufacturing costs.

In a further exemplary aspect of the invention and referring also to FIG. 7, the outer surface of the optical element 112 has a relatively smooth region 118 that allows the optical element to be picked up using a conventional vacuum pick-up placement device. This configuration facilitates the manufacturing of the arrangement by allowing automation for picking-up and placing the optical element 112 over the light emitters 98, 98' and light-sensing device 110. In this exemplary illustrated aspect of the invention, the smooth region 118 is relatively flat. However, the smooth region 118 is not limited to this configuration, but can have any shape suitable for use with a conventional vacuum pick-up placement device.

Referring back to FIG. 5, and in another aspect of the invention, the optical element 112 is positioned over the dummy light emitter 98', so that a gap exists between the lower edges of the optical element and the surface of the dummy light emitter. That is, the optical element 112 does not directly contact the dummy light emitter 98'. By providing a gap, for example of a few hundred microns, it can be ensured that the optical element 112 will not damage the fragile surface of the light emitter.

Further, in another exemplary aspect of the invention, the chip 100 of the light emitters may be positioned directly on a light-sensing device 110. For example, if the light-sensing device 110 is a photodiode, and the light emitters 98, 98' are VCSELs formed on a common chip, the VCSEL chip can be disposed directly upon the photodiode chip. With such an arrangement, a base edge of the optical element 112 could be provided with feet 120, as shown in FIG. 6, that rest directly upon the photodiode chip, and which are tailored so that the optical element is positioned over the dummy VCSEL with the desired gap. The feet could then be fastened to the photodiode chip using a UV curable epoxy, for example. Alternatively, instead of feet, the gap could be formed by depositing the UV curable epoxy under the base of the optical element, for example, to a thickness that would provide for the desired gap.

Furthermore, although it is believed to be particularly advantageous to dispose the chip 100 and the light emitters 98, 98' directly upon the light-sensing device 110, it is also contemplated that the light emitters could be disposed in other configurations relative to the light-sensing device. For example, the light-sensing device could be placed adjacent and to the side of the light emitters, or even formed in the same chip as the light emitters.

Figure 8:
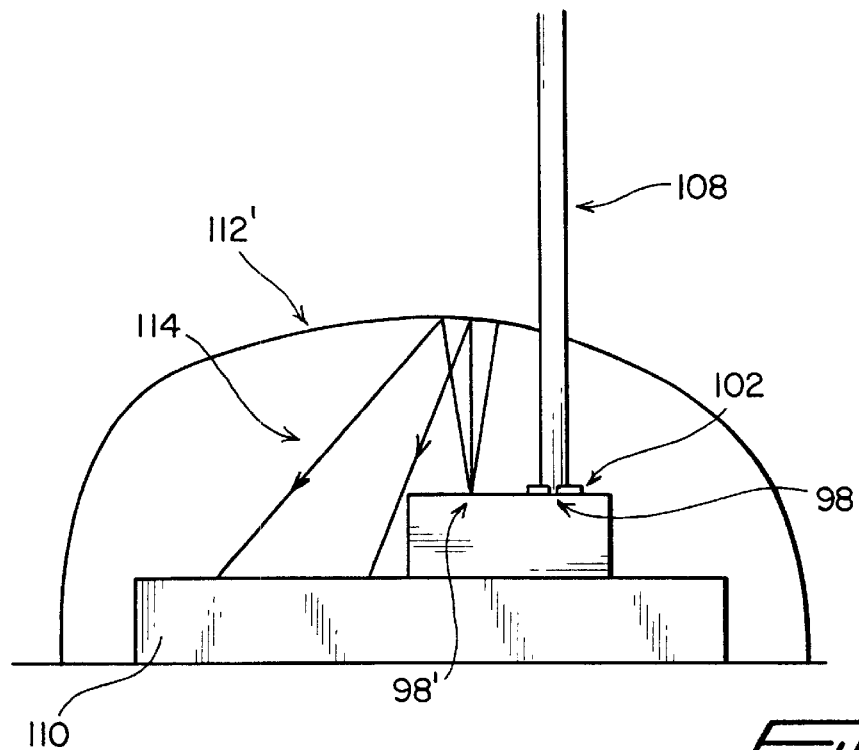
FIG. 8 is a side view of another exemplary aspect of an optical element according to the present invention.

Referring to FIG. 8, in another exemplary aspect of the invention, instead of having a molded cap-shaped optical element, the optical element 112' could be configured as a somewhat rounded glob of transparent epoxy, for example. The epoxy (or other suitable material) could be easily deposited over the light emitters 98, 98' and the light-sensing device 110 while in a semi-liquid state, and then allowed to cure. In use, some of the emitted light 114 from the dummy light emitter 98' will be internally reflected within the optical element 112' to reach the light-sensing device 110. It is believed that the total light reaching the light-sensing device 110 will be less than when using a molded optical element, as described above. Nevertheless, it is further believed that this arrangement will provide sufficient light to the light-sensing device 110 to monitor and control the optical power of the active light emitter 98, as will be described. Moreover, this aspect of the invention would be easy to implement, and eliminates one of the two-steps of the earlier-described aspect of the invention, i.e., the optical element 112' will be self-fastening to the light-sensing device 110 and to the light emitters 98, 98'.

In this illustrated aspect of the invention, the optical element 112' covers both the active light emitter 98 and the dummy light emitter 98'. Thus, the optical element 112' will prevent the optical fiber 108 from being removed from its engagement with the active light emitter 98. However, and referring to FIG. 9, it is also contemplated that the optical element 112' could be configured to cover only the dummy light emitter 98' and the active region of the light-sensing device 110, as in the previously-described aspect of the invention, without departing from the spirit and scope of the invention.

In use, a portion of the light 114 emitted from the dummy light emitter 98' is collected and reflected by the optical element 112, 112' to the light-sensing device 110. The light-sensing device 110 uses the detected light to generate a control signal having a signal strength proportional to the optical power of the emitted light 114. The light-sensing device 110 sends the control signal to control circuitry 122, which simultaneously controls the optical power output of both the active and dummy light emitters 98, 98' based on the signal strength of the control signal. Such control circuitry could be incorporated within the light-sensing device chip 110, on a separate circuit board 124, or within the chip 100 of the light emitters, for example. Further, such control circuitry is well known to those skilled in the pertinent art.

In accordance with this exemplary aspect of the invention, the light-sensing device 110 varies the signal strength of the control signal in response to changes in the optical power output of the dummy light emitter 98'. Further, the dummy light emitter 98', light-sensing device 110 and control circuitry 122 form a closed loop system used to control the optical power output of an active light emitter 98.

In the illustrated exemplary aspects of the invention, only one active VCSEL and one adjacent dummy VCSEL have been shown. However, it is contemplated that the signal from one dummy VCSEL (or other type of light emitter) can be used to control the optical power of a plurality of adjacent active VCSELs (or other types of light emitters). For example, the dummy VCSEL can be disposed between two active VCSELs, and used to control both. Alternatively, it is also contemplated that the detected outputs from several dummy VCSELs could be averaged, with the averaged value being used to control one or more active VCSELs. With such configurations, the optical element can be configured to cover more than just one dummy VCSEL and one active VCSEL. Alternatively, separate optical elements could be provided for each dummy and active VCSEL pair.

Moreover, the above-described exemplary aspects of the invention were described in connection with an optical fiber connected to an active light-emitting device using a fiber guide. However, it is contemplated that the concepts of the present invention can be used whenever a light emitter is coupled to an optical fiber. For example, it is believed that the invention could be used when an active VCSEL, for example, is connected to an optical fiber using coupling lenses, fiber butt-coupling without the use of fiber guides, or diffractive optical coupling elements.

Furthermore, although the concepts of the present invention are believed to be particularly well suited for use with VCSELs or other surface emitters, other types of light emitters may be used as well. For example, it is contemplated that the present invention could be used with edge emitters, such as edge emitting lasers, without departing from the spirit and scope of the invention.

Additionally, the present invention is particularly well suited for computer and communication fiber optic systems. For example, in an exemplary aspect of the invention, the above-described fiber optic arrangement could be disposed on circuit board 124 located within a computer housing 126 of a computer. However, the invention may also be used whenever it is desired to monitor an output from a light emitter, regardless of how the light emitter is being used. For example, the present invention may be applied to lasers used in test equipment or sensors.

It should be understood, however, that the invention is not necessarily limited to the specific process, arrangement, materials and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A light emitter control system, comprising:
   a first light emitter;
   a second light emitter;
   a light-sensing device; and
   an optical element for transmitting, scattering and dispersing light emitted from said first light emitter to said light-sensing device for controlling an output optical power of at least said second light emitter.

2. The light emitter control system as recited in claim 1, further comprising control circuitry coupled to said light-sensing device and to said first and second light emitters; wherein said light-sensing device generates a control signal having a signal strength proportional to an output optical power of said first light emitter and transmits the control signal to said control circuitry; and wherein said control circuitry controls the output optical power of at least said second light emitter based on the signal strength of the control signal.

3. The light emitter control system as recited in claim 2, wherein said control circuitry simultaneously controls the output optical power of said first light emitter and said second light emitter based on the signal strength of the control signal.

4. The light emitter control system as recited in claim 1, wherein said first light emitter and said second light emitter are formed on a common chip.

5. The light emitter control system as recited in claim 4, wherein said first light emitter and said second light emitter are VCSELs.

6. The light emitter control system as recited in claim 4, wherein said first light emitter and said second light emitter are disposed immediately adjacent to each other.

7. The light emitter control system as recited in claim 4, wherein said common chip is disposed on said light-sensing device.

8. The light emitter control system as recited in claim 1, wherein said light-sensing device is a monitor photodiode.

9. The light emitter control system as recited in claim 1, wherein said optical element is disposed over to cover said light-sensing device and at least said first light emitter, said optical element collecting the light emitted from said first light emitter and reflecting the collected light to said light-sensing device.

10. The light emitter control system as recited in claim 9, wherein said optical element is cap-shaped, and is molded from optical plastic.

11. The light emitter control system as recited in claim 10, wherein the optical plastic is coated with a reflecting material.

12. The light emitter control system as recited in claim 10, wherein said optical element is separated from said first light emitter by a gap so as to not touch said first light emitter.

13. The light emitter control system as recited in claim 12, wherein said first and second light emitters are disposed on said light-sensing device; wherein said optical element has a foot at a base edge thereof, said foot being attached to said light-sensing device to keep said optical element separated from said first light emitter by the gap.

14. The light emitter control system as recited in claim 12, wherein said first and second light emitters are disposed on said light-sensing device; wherein said optical element has a base attached to said light-sensing device using an epoxy having a thickness sufficient to keep said optical element separated from said first light emitter by the gap.

15. A light emitter control system, comprising:
   a first light emitter;
   a second light emitter;
   a light-sensing device; and
   an optical element for transmitting light emitted from said first light emitter to said light-sensing device for controlling an output optical power of at least said second light emitter,
   wherein said optical element is disposed over to cover said light-sensing device and at least said first light emitter, said optical element collecting the light emitted from said first light emitter and reflecting the collected light to said light-sensing device, and wherein said optical element is a glob of transparent epoxy that has been cured.

16. The light emitter control system as recited in claim 15, wherein said optical element additionally covers said second light emitter.

17. A light emitter control system, comprising:

a first light emitter;

a second light emitter, said first light emitter and said second light emitter being formed on a chip;

a light-sensing device;

an optical element for transmitting light emitted from said first light emitter to said light-sensing device for controlling an output optical power of at least said second light emitter; and a guide formed on said chip and in registration with an active region of said second light emitter, said guide being adapted to align an optical fiber relative to the active region of said second light emitter.

18. The light emitter control system as recited in claim 17, wherein said guide is formed directly on said chip.

19. The light emitter control system as recited in claim 18, wherein said guide is formed from a photoresist material.

20. A light emitter control system, comprising:

a first light emitter;

a second light emitter;

a light-sensing device; and an optical element for transmitting light emitted from said first light emitter to said light-sensing device for controlling an output optical power of at least said second light emitter, wherein said optical element includes a plurality of reflecting surfaces adapted to sequentially transmit the light emitted from said first light emitter to said light-sensing device.

21. A fiber optic arrangement, comprising:

a first light emitter;

a second light emitter;

an optical fiber coupled to said second light emitter for transmitting light from said second light emitter;

a light-sensing device;

an optical element for transmitting light emitted from said first light emitter to said light-sensing device for controlling an output optical power of at least said second light emitter;

a chip having at least said second light emitter formed thereon; and a guide formed on said chip and in registration with an active region of said second light emitter, said guide aligning said optical fiber relative to the active region of said second light emitter.

22. The fiber optic arrangement as recited in claim 21, wherein said optical fiber is directly coupled to said second light emitter for transmitting the light emitted from said second light emitter.

23. The fiber optic arrangement as recited in claim 21, wherein said guide is formed directly on said chip.

24. The fiber optic arrangement as recited in claim 23, wherein said guide is formed from a photoresist material.

25. The fiber optic arrangement as recited in claim 21, wherein said first light emitter is formed on said chip.

26. The fiber optic arrangement as recited in claim 21, further comprising control circuitry coupled to said light-sensing device and to said first and second light emitters; wherein said light-sensing device generates a control signal having a signal strength proportional to an output optical power of said first light emitter and transmits the control signal to said control circuitry; and wherein said control circuitry controls the output optical power of at least said second light emitter based on the signal strength of the control signal.

27. The fiber optic arrangement as recited in claim 26, wherein said control circuitry simultaneously controls the output optical power of at least said first light emitter and said second light emitter based on the signal strength of the control signal.

28. The fiber optic arrangement as recited in claim 21, wherein said first light emitter and said second light emitter are formed on the chip.

29. The fiber optic arrangement as recited in claim 28, wherein said first light emitter and said second light emitter are VCSELs.

30. The fiber optic arrangement as recited in claim 28, wherein said chip is disposed on said light-sensing device.

31. The fiber optic arrangement as recited in claim 21, wherein said light-sensing device is a monitor photodiode.

32. The fiber optic arrangement as recited in claim 21, wherein said optical element is disposed over to cover said light-sensing device and said first light emitter, said optical element collecting the light emitted from said first light emitter and reflecting the collected light to said light-sensing device.

33. The fiber optic arrangement as recited in claim 32, wherein said optical element is cap-shaped, and is molded from optical plastic.

34. The fiber optic arrangement as recited in claim 33, wherein the optical plastic is coated with a reflecting material.

35. The fiber optic arrangement as recited in claim 33, wherein said optical element is separated from said first light emitter by a gap so as to not touch said first light emitter.

36. The fiber optic arrangement as recited in claim 35, wherein said first and second light emitters are disposed on said light-sensing device; and wherein said optical element has a foot at a base edge thereof, said foot being attached to said light-sensing device to keep said optical element separated from said first light emitter by the gap.

37. The fiber optic arrangement as recited in claim 35, wherein said first and second light emitters are disposed on said light-sensing device; and wherein said optical element has a base attached to said light-sensing device using an epoxy having a thickness sufficient to keep said optical element separated from said first light emitter by the gap.

38. The fiber optic arrangement as recited in claim 32, wherein said optical element is a glob of transparent epoxy that has been cured.

39. The fiber optic arrangement as recited in claim 32, wherein said optical element additionally covers said second light emitter.

40. A method of controlling an output optical power of a light emitter, comprising:

providing an active light emitter and a dummy light emitter on a common chip;

disposing an optical element over the dummy light emitter;

using the optical element to transmit, disperse and scatter emitted light from the dummy light emitter to a light-sensing device;

detecting an output optical power of the dummy light emitter; and controlling an output optical power of at least the active light emitter based on a detected output optical power of the dummy light emitter.

41. The method of controlling as recited in claim 40, wherein said controlling includes generating a control signal having a signal strength proportional to the output optical power of the dummy light emitter; and controlling the output optical power of at least the active light emitter based on the signal strength of the control signal.

42. The method of controlling as recited in claim 41, wherein said controlling includes simultaneously controlling the output optical power of the dummy light emitter and the active light emitter based on the signal strength of the control signal.

43. The method of controlling as recited in claim 40, wherein said providing includes directly coupling an optical fiber to the active light emitter for transmitting light therefrom.

44. A method of controlling an output optical power of a light emitter, comprising:
   providing an active light emitter and a dummy light emitter on a common chip;
   disposing an optical element over the dummy light emitter;
   using the optical element to transmit emitted light from the dummy light emitter to a light-sensing device;
   detecting an output optical power of the dummy light emitter; and
   controlling an output optical power of at least the active light emitter based on a detected output optical power of the dummy light emitter,
   wherein said providing includes directly coupling an optical fiber to the active light emitter for transmitting light therefrom, and
   wherein said providing includes forming a guide on the common chip and in registration with an active region of the active light emitter, and aligning the optical fiber relative to the active region using the guide.

45. The method of controlling as recited in claim 44, wherein the guide is formed from a photoresist material.

46. The method of controlling as recited in claim 40, wherein the active light emitter and the dummy light emitter are VCSELs.

47. The method of controlling as recited in claim 40, wherein the common chip is disposed on the light-sensing device.

48. The method of controlling as recited in claim 47, wherein the light-sensing device is a monitor photodiode.

49. The method of controlling as recited in claim 40, wherein said disposing includes covering the light-sensing device and the dummy light emitter with the optical element, and wherein the optical element collects the light emitted from the dummy light emitter and reflects the collected light to the light-sensing device.

50. The method of controlling as recited in claim 49, further comprising molding the optical element from optical plastic to be cap-shaped.

51. The method of controlling as recited in claim 50, further comprising coating the optical plastic with a reflecting material.

52. The method of controlling as recited in claim 49, wherein said disposing includes separating the optical element from the dummy light emitter by a gap so as to not touch the dummy light emitter.

53. A method of controlling an output optical power of a light emitter, comprising:
   providing an active light emitter and a dummy light emitter on a common chip;
   disposing an optical element over the dummy light emitter;
   using the optical element to transmit emitted light from the dummy light emitter to a light-sensing device;
   detecting an output optical power of the dummy light emitter; and
   controlling an output optical power of at least the active light emitter based on a detected output optical power of the dummy light emitter,
   wherein said disposing includes covering the light-sensing device and the dummy light emitter with the optical element, and wherein the optical element collects the light emitted from the dummy light emitter and reflects the collected light to the light-sensing device, and
   wherein said disposing includes depositing a glob of transparent epoxy on the dummy light emitter and the light-sensing device to form the optical element.

54. The method of controlling as recited in claim 53, wherein the optical element additionally covers the active light emitter.

55. A computer, comprising:
   a housing;
   at least one printed circuit board disposed within said housing; and
   a fiber optic arrangement, comprising:
      a chip coupled to said printed circuit board;
      a dummy VCSEL disposed on said chip;
      an active VCSEL disposed on said chip;
      a photoresist guide formed on said chip and in registration with an active region of said active VCSEL;
      an optical fiber directly coupled to said active VCSEL for transmitting light emitted from the active region of said active VCSEL, said guide aligning said optical fiber with the active region of said active VCSEL;
      a monitor photodiode having said chip disposed thereon;
      an optical element disposed over to cover at least said dummy VCSEL and said monitor photodiode, said optical element collecting light emitted from said dummy VCSEL and reflecting the collected light to said monitor photodiode; and
      control circuitry coupled to said monitor photodiode, said active VCSEL and said dummy VCSEL; wherein said monitor photodiode generates a control signal having a signal strength proportional to an output optical power of the dummy VCSEL and transmits the control signal to said control circuitry; and wherein said control circuitry simultaneously controls the output optical power of at least the dummy VCSEL and the active VCSEL based on the signal strength of the control signal.

56. The method of controlling as recited in claim 40, wherein said disposing includes positioning the optical element using a passive alignment technique.

* * * * *